US012789622B2

(12) United States Patent
Beck et al.

(10) Patent No.: US 12,789,622 B2
(45) Date of Patent: Nov. 10, 2026

(54) GEARBOX, DRIVETRAIN, AND VEHICLE WITH GEARBOX

(71) Applicant: ZF FRIEDRICHSHAFEN AG, Friedrichshafen (DE)

(72) Inventors: Stefan Beck, Eriskirch (DE); Matthias Reisch, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 396 days.

(21) Appl. No.: 17/714,742

(22) Filed: Apr. 6, 2022

(65) Prior Publication Data

US 2022/0324323 A1 Oct. 13, 2022

(30) Foreign Application Priority Data

Apr. 7, 2021 (DE) ..................... 10 2021 203 412.8

(51) Int. Cl.

*B60K 17/16* (2006.01)
*B60K 17/04* (2006.01)
*B60K 17/346* (2006.01)
*F16H 48/10* (2012.01)

(52) U.S. Cl.

CPC ............ *B60K 17/16* (2013.01); *B60K 17/046* (2013.01); *B60K 17/165* (2013.01); *B60K 17/346* (2013.01); *F16H 48/10* (2013.01); *F16H 2200/0021* (2013.01)

(58) Field of Classification Search

CPC ............. F16H 48/10; F16H 2200/0021; B60K 17/046; B60K 17/165; B60K 17/365; B60K 17/16; B60K 17/346; B60K 5/02

See application file for complete search history.

(56) References Cited

U.S. PATENT DOCUMENTS

| | | | | |
|---|---|---|---|---|
| 5,845,732 | A | 12/1998 | Taniguchi et al. | |
| 7,867,125 | B2 * | 1/2011 | Kim | B60K 17/046 475/221 |
| 9,671,016 | B2 * | 6/2017 | Nakayama | F16H 48/27 |

(Continued)

FOREIGN PATENT DOCUMENTS

| | | |
|---|---|---|
| DE | 10 2011 079 975 | 1/2013 |
| DE | 10 2013 210 312 | 12/2014 |

(Continued)

OTHER PUBLICATIONS

Office Action issued in corresponding German Application No. 10 2021 203 412.8 dated Oct. 28, 2021.

(Continued)

*Primary Examiner* — Emma K Frick
(74) *Attorney, Agent, or Firm* — COZEN O''CONNOR

(57) ABSTRACT

A gearbox includes: an input shaft; a first output shaft; a second output shaft; a first planetary gearset; and a second planetary gearset connected to the first planetary gearset. The input shaft, the first and second output shafts, and the first and second planetary gearsets are configured such that a torque introduced via the input shaft is converted and distributed in a defined ratio to the first and second output shafts, so as to prevent formation of a sum torque. The first planetary gearset is configured as a minus planetary gearset, and the second planetary gearset is configured as a plus planetary gearset.

11 Claims, 10 Drawing Sheets

(56) References Cited

U.S. PATENT DOCUMENTS

| | | | | |
|---|---|---|---|---|
| 10,632,835 | B2 * | 4/2020 | Ziemer | F16H 3/663 |
| 11,168,773 | B2 * | 11/2021 | Trautmann | F16H 48/36 |
| 11,738,633 | B2 * | 8/2023 | Wechs | B60K 6/365<br>477/3 |
| 11,994,195 | B2 * | 5/2024 | Beck | F16H 37/082 |

FOREIGN PATENT DOCUMENTS

| | | | | |
|---|---|---|---|---|
| DE | 102013210319 | | 12/2014 | |
| DE | 102013210321 | A1 * | 12/2014 | F16H 48/10 |
| DE | 102013215879 | A1 * | 2/2015 | F16H 37/082 |
| DE | 10 2013 221 465 | | 4/2015 | |
| DE | 102014209946 | | 11/2015 | |
| DE | 102017111040 | A1 * | 11/2018 | B60K 17/04 |
| DE | 10 2018 112 880 | | 12/2018 | |
| DE | 10 2018 108 669 | | 10/2019 | |
| DE | 102023206270 | A1 * | 4/2024 | |
| WO | WO 2005/120877 | | 12/2005 | |
| WO | WO 2015/062597 | | 5/2015 | |
| WO | WO-2015062597 | A1 * | 5/2015 | B60K 17/046 |

OTHER PUBLICATIONS

Office Action dated Dec. 20, 2022 issued in German Patent Application No. 102021203412.8.

* cited by examiner

GEARBOX, DRIVETRAIN, AND VEHICLE WITH GEARBOX

BACKGROUND OF THE INVENTION

1. Field of the Invention

The invention is directed to a gearbox, particularly for a motor vehicle. The invention is further directed to a drivetrain and a vehicle.

2. Description of the Related Art

Gearboxes are known from the prior art, for example, from DE 10 2011 079 975 A1, which provide a torque conversion as ratio of an output torque to an input torque and a transmission ratio as ratio of an input torque to an output torque.

An electric vehicle with an integrated differential is known from DE 10 2018 112 880 A1. The electric vehicle drive system contains an electric motor, first planetary gear units and second planetary gear units, including sun gear, planet carrier, ring gear elements, first output shaft and second output shaft, and a housing. The elements of the first planetary gear unit are connected to the electric motor, the first output shaft and an element of the second planetary gear unit. The elements of the second planetary gear unit are connected to the first planetary gear unit, the housing and the second output shaft. The first planetary gear unit provides a differential-reduction mechanism, and the second planetary gear unit constitutes a reversal-reduction mechanism. Optional clutches may provide the function of a limited slip differential and distribute torque to one or the other output shaft.

A gearbox of this kind, which is also known as a rolling differential, does not form a sum torque (for example, at a differential carrier) as is otherwise common in the prior art. Preventing the formation of a sum torque means that the sum of the individual torques present at the two output shafts is not present at any rotating component such as the input shaft, output shaft or elements of the planetary gearsets.

SUMMARY OF THE INVENTION

It is an object of the invention in particular to provide a gearbox, particularly in the form of an integrated or rolling differential, which enables an improved transmission, particularly a higher gear ratio. A further object of the invention is to provide a drivetrain with such a gearbox and a vehicle.

The object may be met by a gearbox comprising an input shaft, a first output shaft, a second output shaft, a first planetary gearset and a second planetary gearset connected to the first planetary gearset. The planetary gearsets respectively comprise a plurality of elements, and a torque introduced at the input shaft is converted and distributed in a defined ratio to the two output shafts. The formation of a sum torque is prevented. At least a third element of the first planetary gearset is connected by of a shaft to a first element of the second planetary gearset so as to be fixed with respect to rotation relative to it, and a second element of the second planetary gearset is secured to a component element which is fixed against relative rotation.

The gearbox is characterized in that the first planetary gearset is formed as a minus planetary gearset, and the second planetary gearset is formed as a plus planetary gearset, and the first planetary gearset and/or second planetary gearset comprises a stepped planet.

By “shaft” is meant herein a rotatable component part of the gearbox via which the associated components of the gearbox are connected to one another in each instance so as to be fixed with respect to relative rotation, or via which a connection of this type is produced when a corresponding shifting element is actuated. The respective shaft can connect the components to one another axially or radially or both axially and radially. Accordingly, the respective shaft can also present an intermediate piece via which a respective component is, e.g., radially connected.

The elements are provided particularly in the form of a sun gear, planet carrier and ring gear.

By “axial” is meant herein an orientation in direction of a longitudinal center axis along which the planetary gearsets are arranged to extend coaxial to one another. Accordingly, by “radial” is meant an orientation in diametrical direction of a shaft lying on the longitudinal center axis.

When an element is fixed, it is prevented from rotational movement. The component element of the gearbox which is fixed with respect to relative rotation can preferably be a permanently stationary component, preferably a housing of the gearbox, a part of such a housing, or a component element which is connected to the housing so as to be fixed with respect to rotation relative to it.

Because the first planetary gearset is formed as a minus planetary gearset and the second planetary gearset is formed as a plus planetary gearset, and at least one of the two comprises a stepped planet, a higher transmission ratio of the gearbox is possible compared with the use of two conventional minus planetary gearsets with large planet gears on the one side and small planet gears on the other side.

The gearbox can be constructed, for example, in such a way that the input shaft is connected to a first element of the first planetary gearset so as to be fixed with respect to rotation relative to it; the first output shaft is connected to a second element of the first planetary gearset so as to be fixed with respect to rotation relative to it; a third element of the first planetary gearset is connected to a first element of the second planetary gearset so as to be fixed with respect to rotation relative to it; a second element of the second planetary gearset is secured to a component element of the gearbox that is fixed with respect to relative rotation; the second output shaft is connected to a third element of the second planetary gearset so as to be fixed with respect to rotation relative to it.

The specification of the torque conversion is to be understood in the following way: the gearbox has two output shafts, and the sum of the torques of these output shafts in relation to the input torque describes the conversion of the gearbox. The transmission ratio of the respective output shaft is initially undefined. It is only when the two output shafts are coupled, for example, via wheels of the vehicle on a roadway, that speeds are defined. If both output shafts rotate at the same speed, as is the case, for example, when driving in a straight line, the transmission ratio can be formed as speed ratio between input speed and one of the two identical output speeds as in the prior art. In no other case is it possible to call a transmission ratio of the gearbox a transmission ratio as it is commonly defined.

The two planetary gearsets may be arranged axially adjacent to one another. However, the first planetary gearset can also be arranged radially inside of the second planetary gearset. The latter configuration may also be referred to as a nested arrangement of the planetary gearsets.

The first planetary gearset is always constructed as a minus planetary gearset. The second planetary gearset is always constructed as a plus planetary gearset.

A minus planet set is composed of the elements sun gear, planet carrier and ring gear in the manner known in principle to the person skilled in the art, the planet carrier guiding at least one, but preferably more, planet gears such that they are rotatably mounted and mesh in particular with the sun gear and the surrounding ring gear.

The elements sun gear, ring gear and planet carrier are likewise provided in a plus planetary gearset, wherein the planet carrier guides at least one planet gear pair in which the one planet gear is in meshing engagement with the inner sun gear and the other planet gear is in meshing engagement with the surrounding ring gear, and the planet gears mesh with one another.

When two elements are in meshing engagement in this way, these elements intermesh, and vice versa.

A stepped planet is a planet gear with two sets of gear teeth having differing pitch circle diameters.

The difference between a "minus stepped planet" and a "plus stepped planet" consists in the connection of the stepped planets. The two stepped planets have a planet carrier connection, i.e., the planet carrier is connected to a further element, e.g., a shaft or a structural component part which is fixed with respect to relative rotation. The minus stepped planet always has a ring gear connection and a sun gear connection; that is, one of the two transmissions of the planetary stage meshingly engages with a ring gear, while the other transmission meshingly engages with a sun gear.

On the other hand, the plus stepped planet either always has two ring gear connections or always has two sun gear connections. In the case of two ring gear connections, one of the two transmissions of the planetary stage meshingly engages with a first ring gear, while the other transmission meshingly engages with a second ring gear. In case of two sun gear connections, one of the two transmissions of the planetary stage meshingly engages with a first sun gear, while the other transmission meshingly engages with a second sun gear.

It is preferable that toothings of the two elements of the first and second planetary gearset which are connected with one another, i.e., the third element of the first planetary gearset and first element of the second planetary gearset, are formed at the same component part.

It is preferable when the lead of the toothing of the third element of the first planetary gearset and the lead of the toothing of the first element of the second planetary gearset have an at least similar quantity, preferably the same quantity and the same mathematical sign. In this way, the connection shaft of the planetary gearsets is axially compensated. Further, the axial force from the toothing of the first element of the first planetary gearset and the axial force from the toothing of the third element of the second planetary gearset are accordingly equal in amount.

By "lead" or "pitch" of a helical toothing is meant the axial path, measured along an associated rotational axis, which is needed in an imaginary continuation of a tooth beyond the actual width of the toothed wheel in order to cause a 360° revolution of the tooth around the axis. The term "thread lead" is used analogously referring to threads. A helical-toothed gear with a plurality of teeth is therefore comparable to a multiple-start thread. The word "pitch" is also used for the corresponding quantity in spindles.

The input shaft for introducing a torque into the gearbox is preferably connected to a prime mover, particularly an electric machine or an internal combustion engine. In the case of the electric machine, it is preferable when the rotor of the electric machine is connected to the input shaft so as to be fixed with respect to rotation relative to it. The rotor preferably communicates with the input shaft via at least one transmission step.

The electric machine can be arranged so as to extend either coaxial or paraxial to the planetary gearsets. In the first case, the rotor of the electric machine can either be directly connected to the input shaft so as to be fixed with respect to rotation relative to it or can be coupled with it via one or more intermediate transmission steps, while the latter allows a more favorable configuration of the electric machine with higher speeds and lower torque. The at least one transmission step can be constructed as a spur gear stage and/or as a planetary stage.

On the other hand, if the electric machine is provided to be axially offset with respect to the planetary gearsets, a coupling is carried out via one or more intermediate transmission steps and/or a traction mechanism drive. The one or more transmission steps can also be realized in particular either as a spur gear stage or as a planetary stage. A traction mechanism drive can be either a belt drive or a chain drive.

In case of a coaxial arrangement of the electric machine, it is preferable that the first output shaft be guided through the rotor of the electric machine. In this way, the gearbox with electric machine is especially compact.

It is preferable that the stationary gear ratio of the two planetary gearsets is calculated from at least approximately 2 minus the reciprocal of the stationary gear ratio of the first planetary gearset, i.e.:

$$i_{02} = 2 - \frac{1}{i_{01}}.$$

The words "at least approximately" are chosen because the asymmetrical gear losses toward the two output shafts during operation under real conditions can result in that a slight deviation from the calculation specification is advantageous in order to obtain identical output torques at both shafts. This wording is also used because it is sometimes impossible to adhere exactly to the calculation specification while adhering to integral numbers of teeth and favorable tooth number combinations, e.g., with respect to acoustic requirements.

The prime mover is preferably installed transversely with respect to a driving direction. The two output shafts are preferably connected to wheels of a vehicle so as to be fixed with respect to rotation relative to them.

It is preferable when the two output shafts distribute the introduced torque to different axles of a vehicle. Accordingly, a longitudinal distributor gearbox arrangement (also known as longitudinal distributor) can be realized, i.e., a gearbox which distributes the introduced torque to a plurality of axles, for example, in particular to a front axle and a rear axle of a vehicle.

The torque distribution of the gearbox to the output shafts need not be carried out uniformly. In particular, in the embodiment form of a longitudinal distributor gearbox, a non-uniform distribution between one axle and the other axle can be carried out non-uniformly. For example, the distribution of the torque provided by the input shaft can be carried out such that 60% is conducted to the rear axle and 40% is conducted to the front axle.

Additionally, within the scope of the invention, a transmission gear unit or a multispeed gear unit, preferably a two-speed gear unit, can be arranged upstream of the gearbox. This transmission or multispeed gear unit can then also be a component part of the gearbox and serves to form an additional transmission ratio in that, for example, the speed of the prime mover is converted and the input shaft is driven at this converted speed. The multispeed gear unit or transmission gear unit can be provided particularly in the form of a planetary gear unit.

The gearbox is, in particular, part of a motor vehicle drivetrain for a hybrid vehicle or electric vehicle and is then arranged between a prime mover of the motor vehicle, which is configured as an internal combustion engine or as an electric machine, and further components of the drivetrain following in the direction of the flow of power to drive wheels of the motor vehicle. The input shaft of the gearbox is preferably coupled with a crankshaft of the internal combustion engine or with the rotor shaft of the electric machine. The gearbox can also be part of a drivetrain for a conventional motor vehicle, i.e., a vehicle which is driven only by an internal combustion engine.

When it is stated that two component elements of the gearbox are "connected" or "coupled" or "communicate with one another" so as to be fixed with respect to relative rotation, this means in accordance with the invention that these component elements are permanently coupled such that they cannot rotate independent from one another. Inasmuch, there is no shifting element provided between these component elements which may be elements of the planetary gearsets and/or also shafts and/or a component element of the gearbox that is fixed with respect to relative rotation. Rather, the corresponding component elements are fixedly coupled with one another. By a torsionally elastic connection between two structural component parts is also meant that these two structural component parts are fixed to co-rotate with one another. In particular, a co-rotationally fixed connection can also include joints, e.g., to allow a steering movement or a deflection of a wheel.

According to another aspect, there is provided a drivetrain for a vehicle which has a gearbox with the features described in the foregoing. The advantages of the gearbox also result for a drivetrain with a gearbox of this type.

According to a further aspect, a vehicle is provided which has a drivetrain with a gearbox having the features described in the foregoing. The advantages of the gearbox also result for a vehicle with a gearbox of this type.

In sum, the invention provides a gearbox and a vehicle with a gearbox of this type which has an integral construction, i.e., torque conversion and torque distribution and a compact and axially short construction (particularly with a nested arrangement). The gearbox is further characterized by a high efficiency and low cost as a result of reduced complexity. Appreciably smaller meshing forces occur. In addition, the set of problems associated with fretting can be mitigated. Further, an extremely low locking value can be shown.

The invention is not limited to the indicated combination of features of the claims. Further, it is possible to combine individual features which proceed from the claims, the following description of the preferred embodiment forms of the invention or directly from the drawings. When the claims refer to the drawings through the use of reference numerals, this is not intended to limit the protective scope of the claims.

BRIEF DESCRIPTION OF THE DRAWINGS

In the drawings.

Advantageous embodiments of the invention which are described in the following are shown in the drawings. The drawings show.

DETAILED DESCRIPTION OF THE PRESENTLY PREFERRED EMBODIMENTS

FIGS. 1A to 1E show schematic views of a gearbox G of a motor vehicle drivetrain 100 of a vehicle 1000 in the form of a passenger car.

Figure 1A:
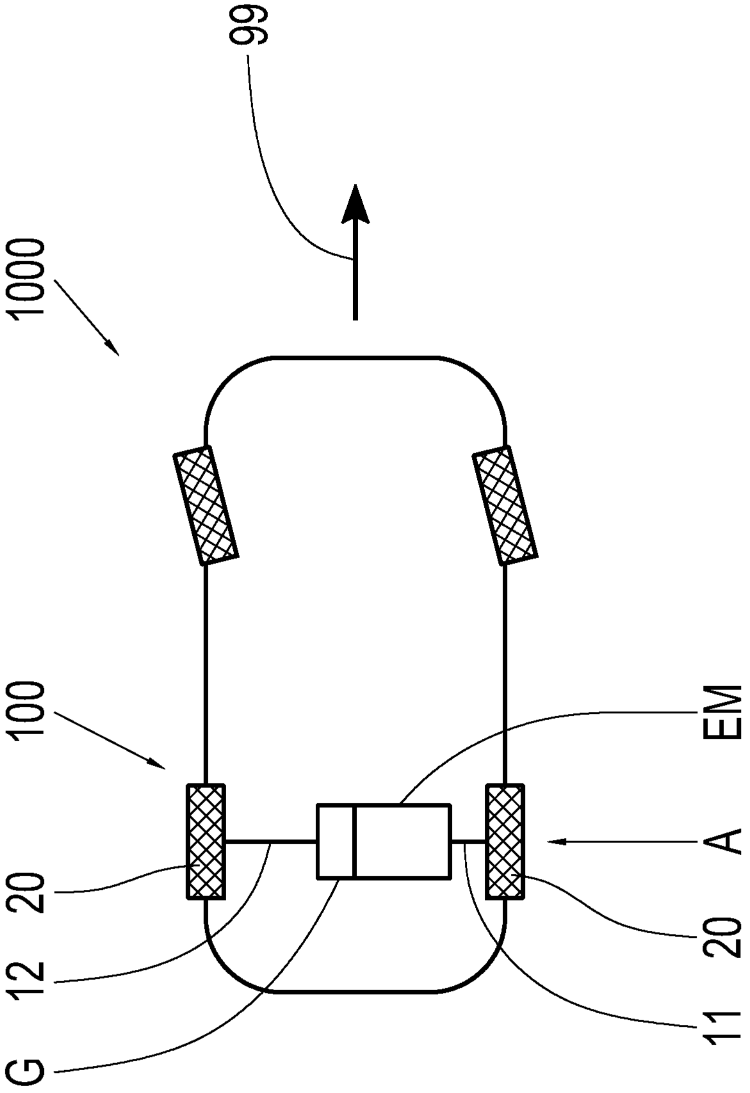
FIGS. 1A-E a schematic view of a motor vehicle drivetrain.

The drivetrain 100 according to FIG. 1A shows an electric drive which drives the rear axle A of the vehicle 1000. The drivetrain comprises a gearbox G which distributes the drive torque of the electric machine EM to two output shafts 11 and 12. The gearbox G and the electric machine are arranged in a common housing. The forward driving direction is shown by arrow 99. As will also be appreciated from FIG. 1A, the gearbox G and the electric machine EM are oriented transverse to the driving direction of the vehicle.

Figure 1B:
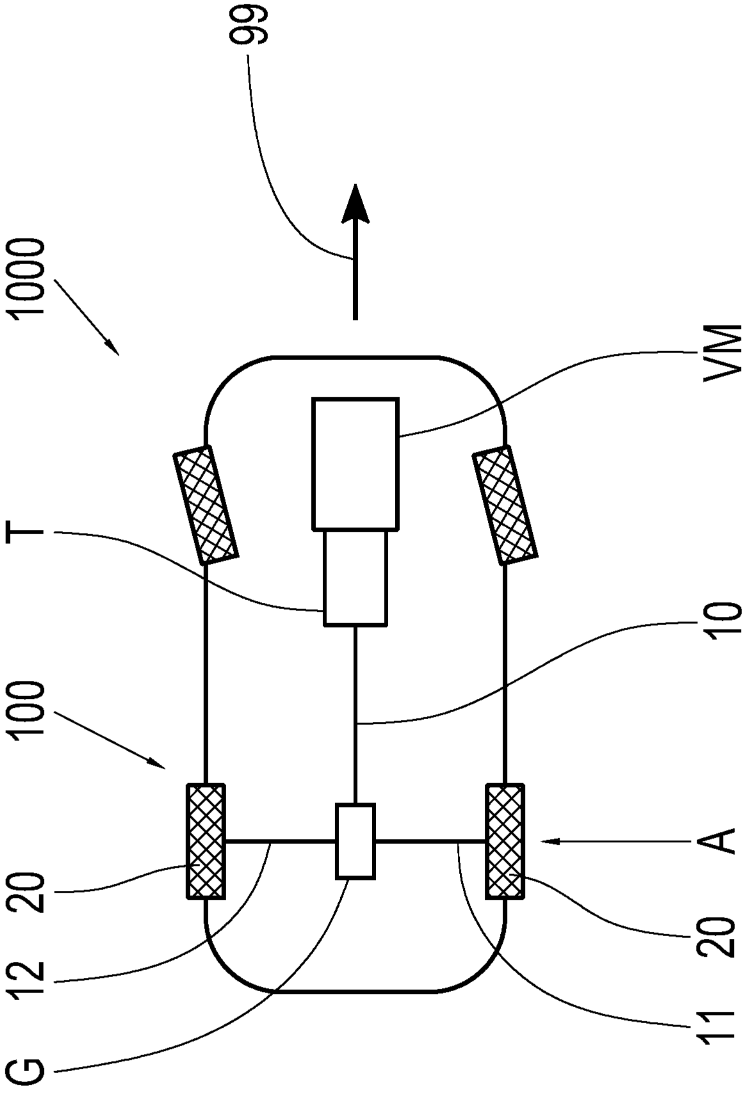

The drivetrain 100 according to FIG. 1B shows an internal combustion engine drive which drives the rear axle A of the vehicle 1000. The drivetrain comprises a gearbox G which distributes the drive torque of the internal combustion engine VM to two output shafts 11 and 12. A further gearbox, for example, an automatic transmission of the vehicle, is arranged between gearbox G and internal combustion engine VM. The forward driving direction is shown by arrow 99. As will also be appreciated from FIG. 1B, the gearbox G and the internal combustion engine VM are oriented longitudinal to the driving direction of the vehicle.

Figure 1C:
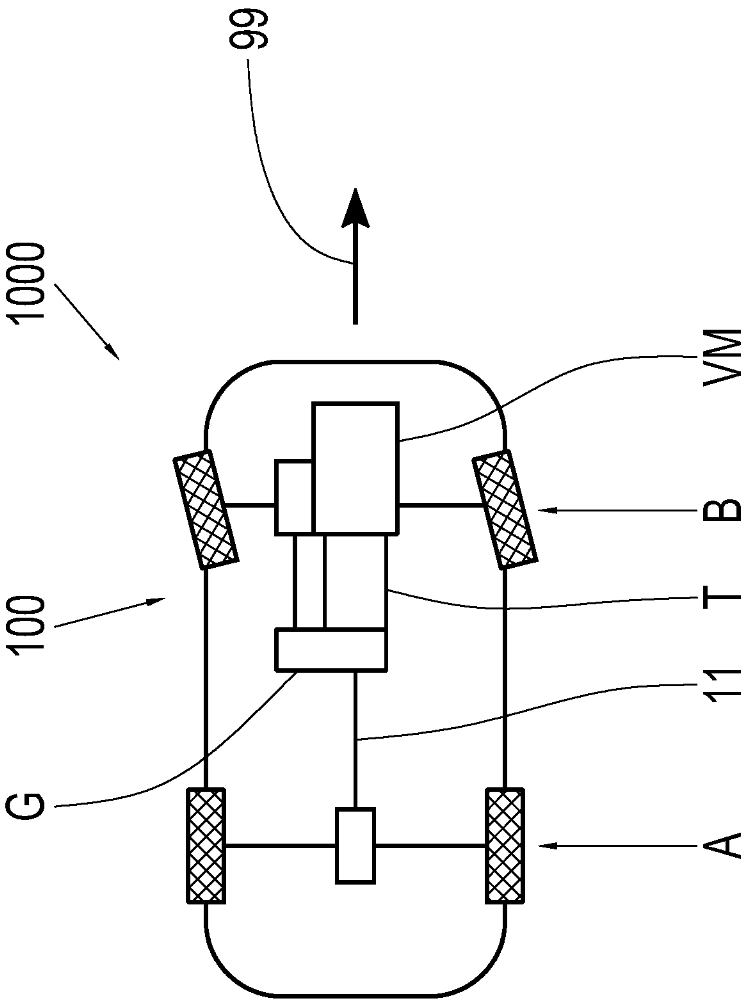

The drivetrain 100 according to FIG. 1C shows an internal combustion engine drive which drives the rear axle A and the front axle B of the vehicle 1000. The drivetrain comprises a gearbox G which distributes the drive torque of the internal combustion engine VM to axles A and B, a further gearbox, for example, an automatic transmission of the vehicle, being arranged between gearbox G and internal combustion engine VM. The gearbox G can then be connected to an axle differential of the rear wheel axle A via an output shaft 11 and to an axle differential of the front axle B via an output shaft 12. The forward driving direction is indicated by arrow 99. As will further be appreciated from FIG. 1C, the gearbox G and the internal combustion engine VM are oriented longitudinal to the driving direction of the vehicle.

Figure 1D:
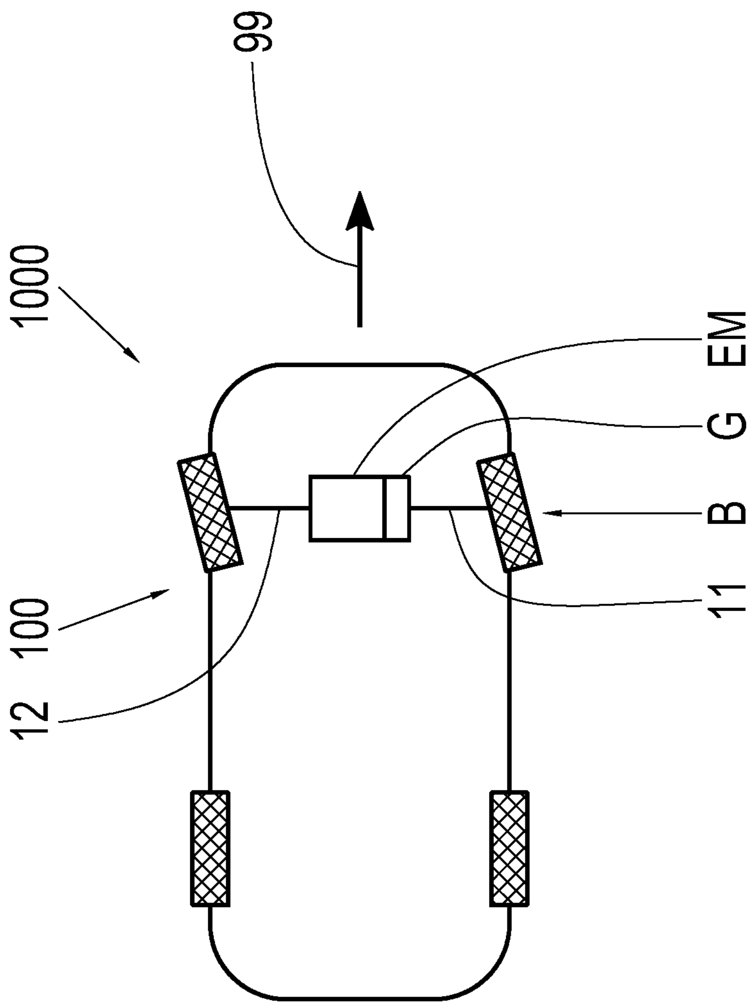

The drivetrain 100 according to FIG. 1D shows an electric drive which drives the front axle B of the vehicle 1000, i.e., an electric front-transverse drive. The drivetrain comprises a gearbox G which distributes the drive torque of the electric machine EM to two output shafts 11 and 12. The gearbox G and the electric machine are arranged in a common housing. The forward driving direction is shown by arrow 99. As will also be appreciated from FIG. 1D, the gearbox G and the electric machine EM are oriented transverse to the driving direction of the vehicle.

Figure 1E:
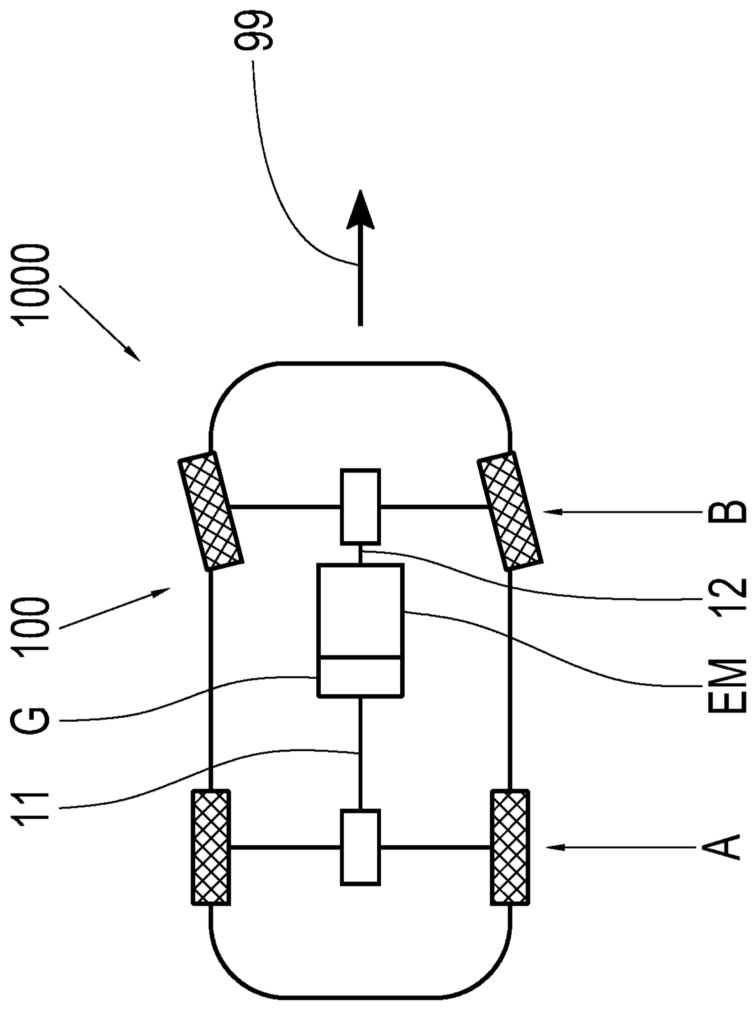

The drivetrain 100 according to FIG. 1E shows an electric all-wheel drive which drives the rear axle A and the front axle B of the vehicle 1000. This is a gearbox constructed as longitudinal distributor. The drivetrain comprises a gearbox G which distributes the drive torque of the electric machine EM to two output shafts 11 and 12. Output shaft 11 transmits the torque to the front axle B, while output shaft 12 transmits the torque to the rear axle A. The respective torques are then introduced in turn into respective axle differentials. The gearbox G and the electric machine are arranged in a common housing. The forward driving direction is shown by arrow 99. As will also be appreciated from FIG. 1E, the gearbox G and the electric machine EM are oriented transverse to the driving direction of the vehicle.

FiThe stationary gear ratio of the two planetary gearsets is calculated from at least approximately 2 minus the reciprocal of the stationary gear ratio of the first planetary gearset, i.e.:

$$i_{02} = 2 - \frac{1}{i_{01}} \dots .$$

This brings about an output torque at the same level and with the same mathematical sign at both output shafts 11, 12 without taking into account gear losses. The stationary gear ratio of the first planetary gearset P1 is designated by $l_{01}$. The stationary gear ratio of the second planetary gearset P2 is designated by $i_{02}$.

FIGS. 2 to 6 show embodiments of the gearbox G, the first planetary gearset being formed as a minus planetary gearset, and the second planetary gearset being formed as a plus planetary gearset, and the first planetary gearset and/or the second planetary gearset comprises a stepped planet gear.

Figure 2:
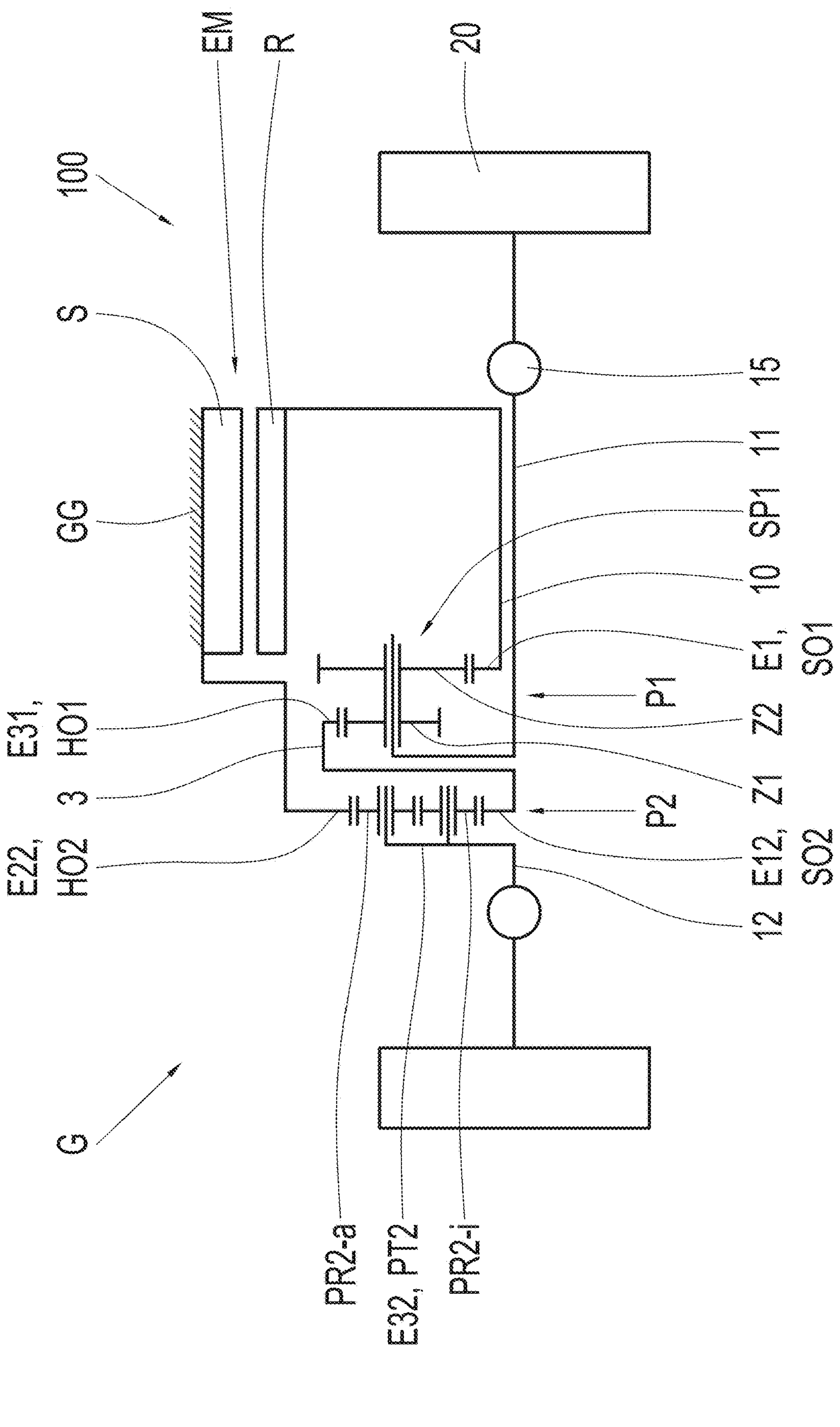
FIGS. 2 to 6 schematic views of several preferred embodiments of the invention.

FIG. 2 shows a drivetrain 100 of a vehicle with a gearbox G in a first preferred embodiment. The gearbox G comprises an input shaft 10, a first output shaft 11, a second output shaft 12, a first planetary gearset P1 and a second planetary gearset P2 connected to the first planetary gearset P1.

The first planetary gearset P1 is formed as a minus planetary gearset, while the second planetary gearset P2 is formed as a plus planetary gearset. The planetary gearsets P1, P2 comprise in each instance a plurality of elements E11, E21, E31, E12, E22, E32. The first element E11 is a sun gear SO1, the second element E21 is a planet carrier PT1, and the third element E31 of the first planetary gearset P1 is a ring gear HO1.

In the second planetary gearset P2, the first element E12 is a sun gear SO2, the third element E32 is a planet carrier PT2, and the second element E22 is a ring gear HO2.

The first planetary gearset P1 further comprises a stepped planet gear SP1 with two toothed wheels Z1 and Z2 of different sizes and, therefore, with two different transmission ratios. The first toothed wheel Z1 is smaller than the second toothed wheel Z2. The first toothed wheel Z1 meshes with the ring gear HO1. The second toothed wheel Z2 meshes with the sun gear SO1.

The planet carrier PT2 supports a plurality of inner and outer planet gears PR2-*i* and PR-2*a*, respectively. The inner planet gears PR2-*i* mesh with the radially inner sun gear SO2. The outer planet gears PR2-*a* mesh with the surrounding ring gear HO2. The inner and outer planet gears mesh with one another in addition.

In the present case, the input shaft 10 is connected to the sun gear SO1 so as to be fixed with respect to rotation relative to it. The first output shaft 11 is connected to the planet carrier PT1 of the first planetary gearset P1 so as to be fixed with respect to rotation relative to it. The second output shaft 12 is connected to the ring gear HO2 of the second planetary gearset P2 so as to be fixed with respect to rotation relative to it. The ring gear HO1 of the first planetary gearset P1 is connected to the sun gear SO2 of the second planetary gearset P2 so as to be fixed with respect to rotation relative to it, while the planet carrier PT2 of the second planetary gearset P2 is secured to a component element GG which is fixed against relative rotation. The component element GG which is fixed against relative rotation is a gearbox housing of the gearbox G.

The ring gear HO1 of the first planetary gearset P1 and the sun gear SO2 of the second planetary gearset P2 form a common structural component part which is a shaft 3 in the present case.

As can be seen from FIG. 2, the input shaft 10, the first output shaft 11 and the second output shaft 12 are arranged coaxial to one another. The two planetary gearsets P1, P2 are likewise arranged coaxial to one another. The two planetary gearsets P1, P2 are arranged to be axially spaced apart from one another according to this embodiment.

Further, it is clearly shown how the first output shaft 11 is guided through the input shaft 10 formed as hollow shaft. The two output shafts 11, 12 are each connected to a drive wheel 20 of the vehicle. Constant velocity joints 15 are provided to enable wheel movements such as steering movement and/or deflection.

The input shaft 10 is connected to a prime mover in the form of an electric machine EM to introduce an input torque into the gearbox G. This means that the input shaft 10 and the output shafts 11, 12 rotate in the same direction.

Because the two planetary gearsets P1, P2 are connected to one another and because the planetary gear carrier PT2 is supported at the gearbox GG, the introduced input torque can be distributed to the two output shafts 11, 12. The gearbox G takes over not only the function of a transmission but also, additionally, that of a differential gearbox. That is, the introduced torque is not only converted but is also distributed to different output shafts. In this embodiment, there is no reversal of rotational direction.

Figure 3:
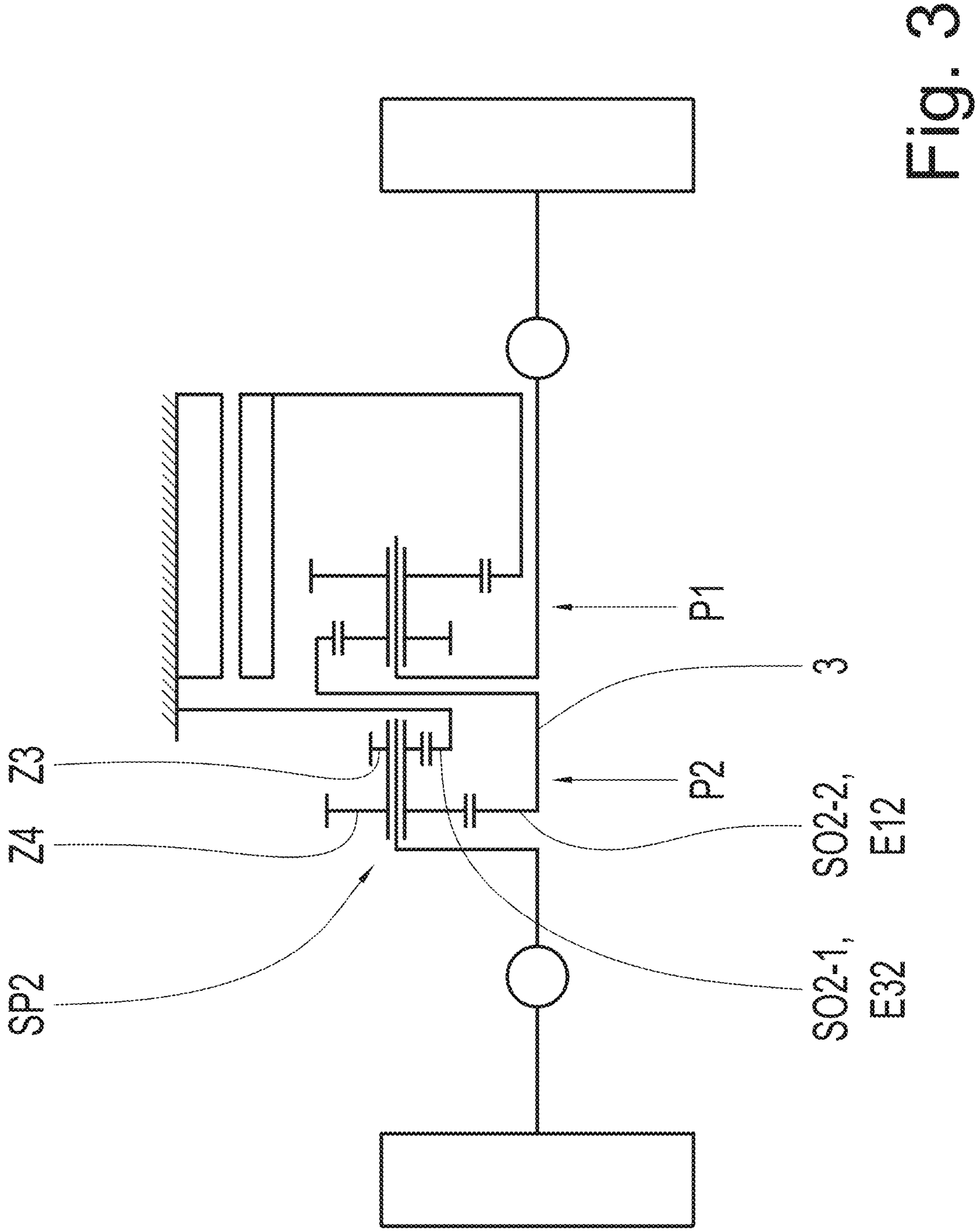

FIG. 3 shows a further embodiment of the invention. In contrast to the embodiment according to FIG. 2, the second planetary gearset P2 likewise has a stepped planet gear, namely, a second stepped planet gear SP2. The latter comprises two sun gear connections. The stepped planet gear SP2 has a third toothed wheel Z3 and a fourth toothed wheel Z4, the third toothed wheel Z3 being smaller than the fourth toothed wheel Z4. The third toothed wheel Z3 meshingly engages with a first sun gear SO2-1. The sun gear SO2-1 is in turn secured to the gearbox housing GG and is accordingly permanently prevented from rotating. The sun gear SO2-1 accordingly represents the second element E22 of the second planetary gearset P2. The fourth toothed wheel Z4 meshingly engages with a second sun gear SO2-2. The sun gear SO2-2 is connected via the shaft 3 to the ring gear HO1 of the first planetary gearset P1 so as to be fixed with respect to rotation relative to it. The sun gear SO2-2 represents the first element E12 of the second planetary gearset P2. The planet carrier PT2 which supports the toothed wheels Z3 and Z4 is connected to the second output shaft 12 so as to be fixed with respect to rotation relative to it. The planet carrier PT2 represents the third element E32 of the second planetary gearset P2. As is clearly shown in FIG. 3, the two planetary gearsets P1 and P2 are arranged axially adjacent to one another, and the first planetary gearset P1 is arranged radially inwardly of the electric machine EM. In other respects, reference is made to the statements referring to the FIG. 2.

Figure 4:
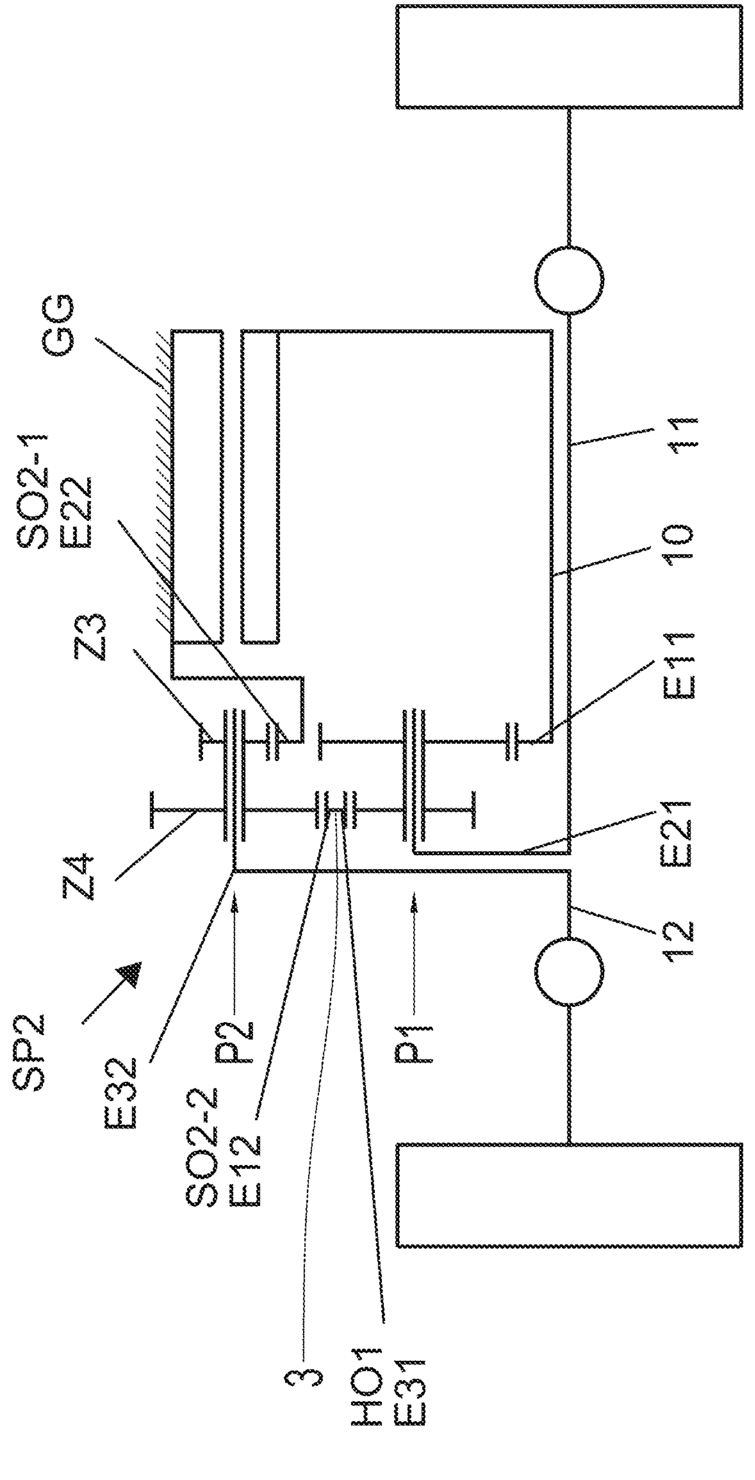

FIG. 4 shows a further preferred embodiment of the invention. In contrast to FIG. 3, the planetary gearsets P1, P2 of the embodiment according to FIG. 4 are not arranged axially adjacent to one another but rather radially one above the other. According to FIG. 4, the second planetary gearset P2 is arranged radially outwardly of the first planetary gearset P1. In other respects, reference is made to the statements referring to FIG. 3.

Figure 5:
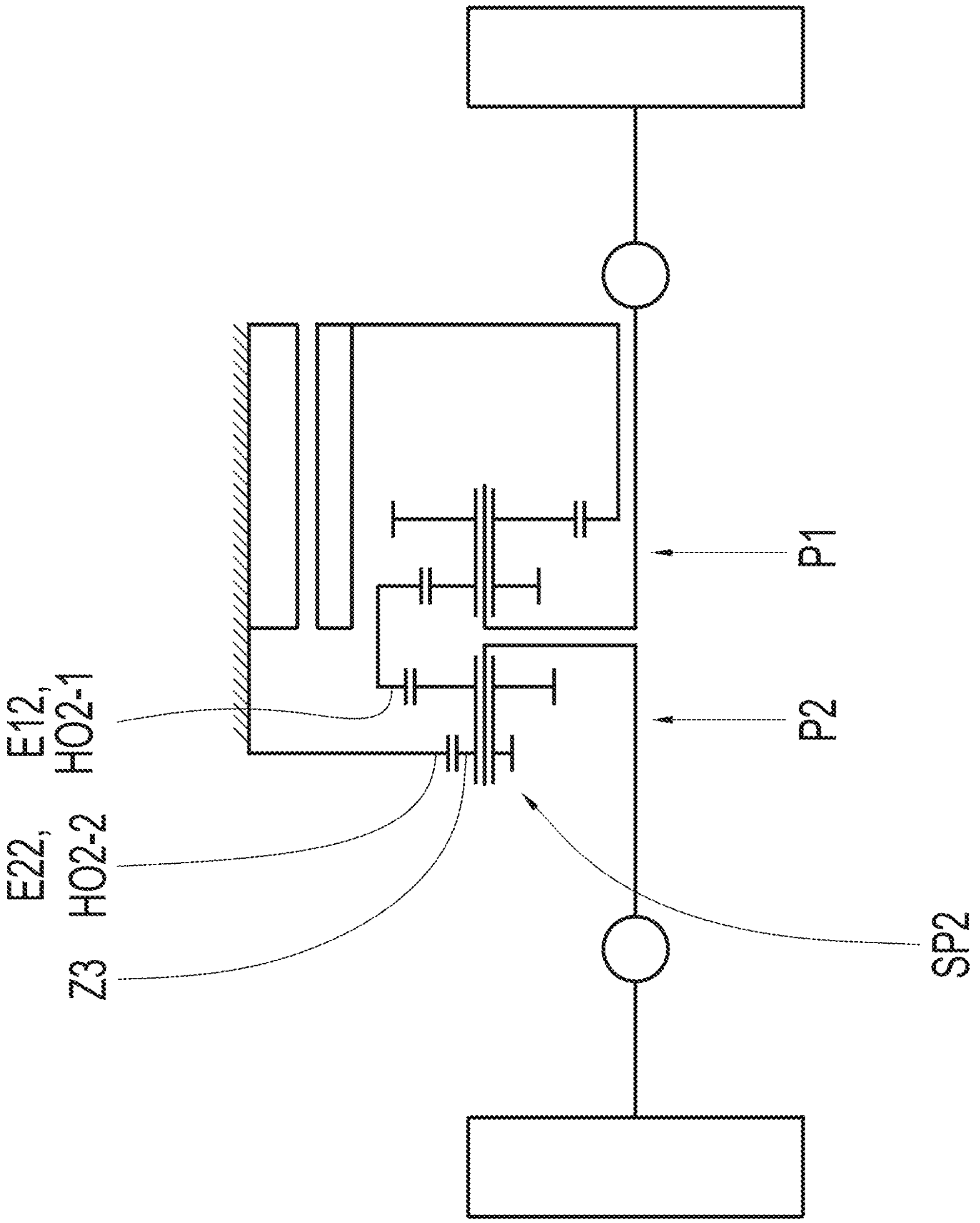

FIG. 5 shows a further preferred embodiment of the invention. In contrast to FIG. 3, the second stepped planet gear SP2 is now constructed with two ring gear connections. The third toothed wheel Z3 meshingly engages with a first ring gear HO2-1, the latter being secured to the housing GG. The ring gear HO2-2 accordingly represents the second element E22 of the second planetary gearset P2. The fourth toothed wheel Z4 meshingly engages with a second ring gear HO2-2. Ring gear HO2-2 is in turn connected via the shaft 3 to ring gear HO1 so as to be fixed with respect to rotation relative to it. Accordingly, ring gear HO2-1 represents the first element E12 of the second planetary gearset P2. As is clearly shown in FIG. 5, the two planetary gearsets P1, P2 are arranged axially adjacent to one another, the first planetary gearset P1 being arranged radially inwardly of the rotor R of the electric machine EM. In other respects, reference is made to the comments referring to FIG. 3.

Figure 6:
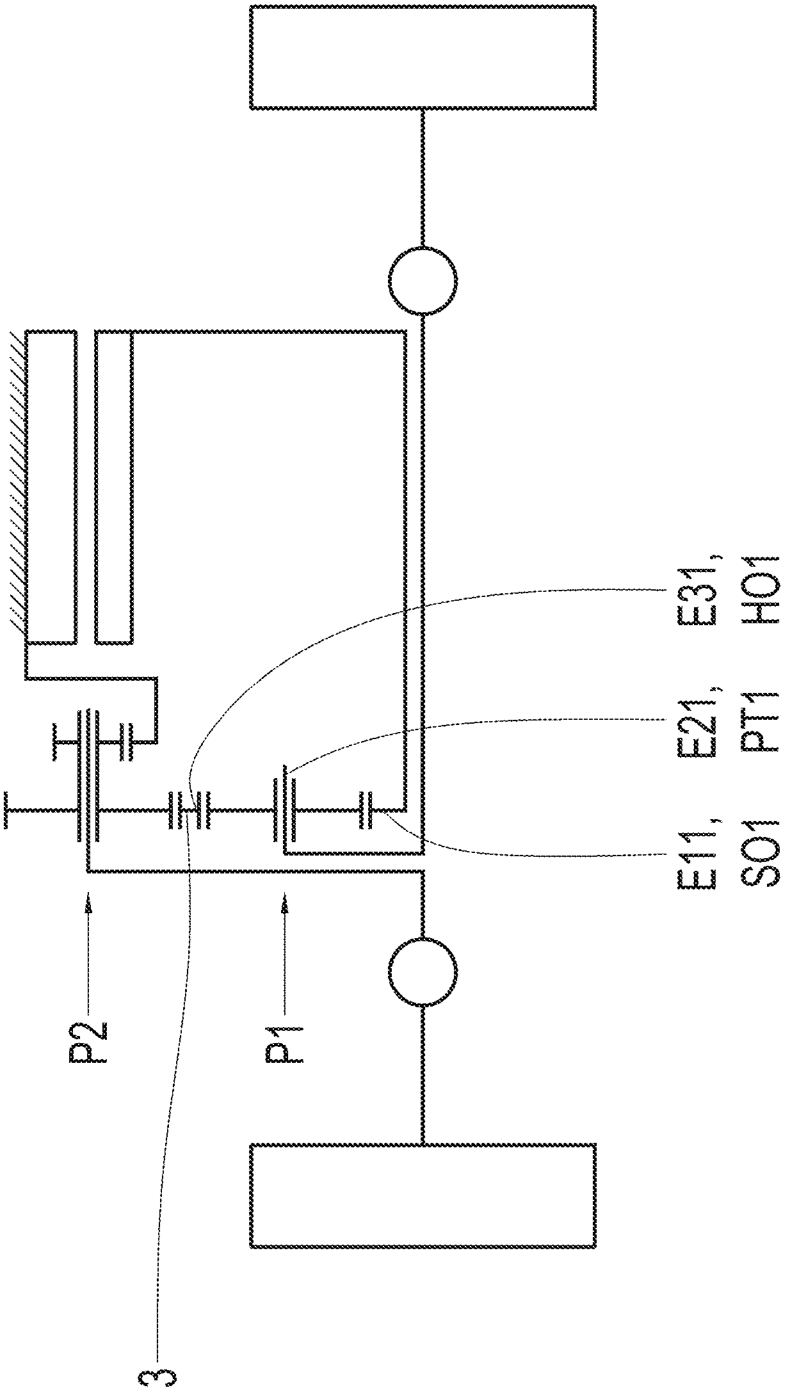

FIG. 6 shows a further preferred embodiment of the invention. In contrast to FIG. 4, the first planet carrier P1 is constructed as a conventional minus planetary gearset and accordingly has no stepped planet gear. The sun gear SO1 is connected to the input shaft 10 so as to be fixed with respect to rotation relative to it, the planet carrier PT1 is connected to the first output shaft 11 so as to be fixed with respect to rotation relative to it, and the ring gear HO1 is connected to the sun gear SO2-2 so as to be fixed with respect to rotation relative to it. The two planetary gearsets P1, P2 are arranged radially one above the other, the second planetary gearset P2 being arranged radially outwardly of the first planetary gearset P1 as is also shown in FIG. 4.

The invention has been described and explained in some detail referring to the drawings and description. The description and explanation are exemplary and not intended to be limiting. The invention is not limited to the disclosed embodiment forms. Other embodiment forms or variations will be apparent to the person skilled in the art in the use of the present invention from an accurate analysis of the drawings, the disclosure and the following patent claims.

In the patent claims, the words "comprise" and "with" are not intended to exclude other elements or steps. The indefinite article "a" does not exclude a plurality. An individual element or an individual unit may carry out the functions of a plurality of units mentioned in the patent claims. The mere mention of some steps in a plurality of different dependent patent claims should not be construed to mean that a combination of these steps cannot likewise be advantageous.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of configuration choice. It is the intention, therefore, to be limited only as indicated by the scope of the claims appended hereto.

We claim:

1. A gearbox (G) comprising:
an input shaft (10);
a first output shaft (11);
a second output shaft (12);
a first planetary gearset (P1); and
a second planetary gearset (P2) connected to the first planetary gearset,
wherein the input shaft (10), the first and second output shafts (11, 12), and the first and second planetary gearsets (P1, P2) are configured such that a torque introduced via the input shaft (10) is converted and distributed in a defined ratio to the first and second output shafts (11, 12), so as to prevent formation of a sum torque,
wherein at least a third element (E31) of the first planetary gearset (P1) is connected by a shaft (3) to a first element (E12) of the second planetary gearset (P2) so as to be permanently fixed with respect to rotation relative to the first element (E 12) of the second planetary gearset (P2), and a second element (E22) of the second planetary gearset (P2) is secured to a component element (GG) which is fixed against relative rotation,
wherein the first planetary gearset (P1) is configured as a minus planetary gearset, and the second planetary gearset (P2) is configured as a plus planetary gearset, and
wherein the first planetary gearset (P1) and/or the second planetary gearset (P2) comprises a stepped planet (SP1, SP2),
wherein each of the first planetary gearset (P1) and the second planetary gearset (P2) comprises a sun gear connection,
wherein the first output shaft (11) is connected to a second element (E21) of the first planetary gearset (P1) so as to be fixed with respect to rotation relative to it, and
wherein the first element, the second element, and the third element of the first planetary gearset (P1), and the second planetary gearset (P2), are each a sun gear, a planet carrier or a ring gear.

2. The gearbox (G) according to claim 1, wherein
the input shaft (10) is connected to a first element (E11) of the first planetary gearset (P1) so as to be fixed with respect to rotation relative to it;
the third element (E31) of the first planetary gearset (P1) is connected to the first element (E12) of the second planetary gearset (P2) so as to be fixed with respect to rotation relative to it;
the second element (E22) of the second planetary gearset (P2) is secured to the component element (GG) of the gearbox (G) that is fixed with respect to relative rotation; and
the second output shaft (12) is connected to a third element (E32) of the second planetary gearset (P2) so as to be fixed with respect to rotation relative to it.

3. The gearbox (G) according to claim 2, wherein the first planetary gearset (P1) comprises a first stepped planet gear (SP1).

4. The gearbox (G) according to claim 3, wherein the second planetary gearset (P2) comprises a second stepped planet gear (SP2).

5. The gearbox (G) according to claim 4, wherein the second stepped planet gear (SP2) has two sun gear connections (SO2-1, SO2-2).

6. The gearbox (G) according to claim 4, wherein the second stepped planet gear (SP2) has two ring gear connections (HO2-1, HO2-2).

7. The gearbox (G) according to claim 2, wherein the first planetary gearset (P1) and the second planetary gearset (P2) each have a stepped planet gear (SP1, SP2).

8. The gearbox (G) according claim 2, wherein the first planetary gearset (P1) is arranged radially inwardly of the second planetary gearset (P2).

9. The gearbox (G) according to claim 2, wherein the first planetary gearset (P1) is arranged axially adjacent to the second planetary gearset (P2).

10. A drivetrain having the gearbox according to claim 1.

11. A vehicle having the drivetrain according to claim 10.

* * * * *